(12) United States Patent
Kaneda

(10) Patent No.: US 10,397,471 B2
(45) Date of Patent: *Aug. 27, 2019

(54) IMAGE PROCESSING APPARATUS, LOCATION INFORMATION ADDING METHOD

(71) Applicant: SONY CORPORATION, Tokyo (JP)

(72) Inventor: Yuichi Kaneda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,222

(22) Filed: Jan. 16, 2018

(65) Prior Publication Data

US 2018/0205881 A1 Jul. 19, 2018

Related U.S. Application Data

(63) Continuation of application No. 15/345,826, filed on Nov. 8, 2016, now Pat. No. 9,900,502, which is a (Continued)

(30) Foreign Application Priority Data

Nov. 21, 2011 (JP) .................. 2011-253840

(51) Int. Cl.
*H04N 1/00* (2006.01)
*H04N 1/32* (2006.01)
(Continued)

(52) U.S. Cl.
CPC ..... *H04N 5/23222* (2013.01); *H04N 1/00323* (2013.01); *H04N 1/32101* (2013.01);
(Continued)

(58) Field of Classification Search
CPC .......... H04N 5/23222; H04N 5/23241; H04N 5/23216; H04N 5/23293; H04N 1/00323; H04N 2201/0084
See application file for complete search history.

(56) References Cited

U.S. PATENT DOCUMENTS 6,437,797 B1 8/2002 Ota
6,657,666 B1 12/2003 Imagawa et al.
(Continued)

FOREIGN PATENT DOCUMENTS

CA 2632172 A1 11/2008
CN 1240297 A 1/2000
(Continued)

OTHER PUBLICATIONS

Notice of Allowance for U.S. Appl. No. 15/345,826, dated Oct. 16, 2017, 7 pages.
(Continued)

*Primary Examiner* — Timothy J Henn
(74) *Attorney, Agent, or Firm* — Chip Law Group

(57) ABSTRACT

An information processing apparatus that acquires captured image data; determines whether a position determining unit of the information processing apparatus detects a location of the information processing apparatus; controls a user interface to prompt a user to enter information when it is determined that a location of the information processing apparatus has not been detected; and receives location information that is extracted based on a user input received at the user interface in response to the prompt.

12 Claims, 12 Drawing Sheets

Related U.S. Application Data continuation of application No. 14/349,378, filed as application No. PCT/JP2012/006783 on Oct. 23, 2012, now Pat. No. 9,509,914.

(51) Int. Cl.
*H04N 5/232* (2006.01)
*H04N 101/00* (2006.01)

(52) U.S. Cl.
CPC ..... *H04N 5/23216* (2013.01); *H04N 5/23241* (2013.01); *H04N 5/23293* (2013.01); *H04N 1/00403* (2013.01); *H04N 1/00411* (2013.01); *H04N 1/00904* (2013.01); *H04N 2101/00* (2013.01); *H04N 2201/0084* (2013.01); *H04N 2201/0098* (2013.01); *H04N 2201/3253* (2013.01); *H04N 2201/3273* (2013.01); *H04N 2201/3274* (2013.01)

(56) References Cited

U.S. PATENT DOCUMENTS

| | | | |
|---|---|---|---|
| 9,509,914 B2 | 11/2016 | Kaneda | |
| 9,900,502 B2 * | 2/2018 | Kaneda | H04N 5/23222 |
| 2003/0063321 A1 | 4/2003 | Inoue et al. | |
| 2003/0160878 A1 | 8/2003 | Nagao | |
| 2007/0236583 A1 | 10/2007 | Vuong et al. | |
| 2008/0012960 A1 | 1/2008 | Uchiyama | |
| 2008/0266421 A1 | 10/2008 | Takahata et al. | |
| 2009/0189811 A1 | 7/2009 | Tysowski et al. | |
| 2010/0045518 A1 | 2/2010 | Lee et al. | |
| 2010/0097494 A1 | 4/2010 | Gum et al. | |
| 2011/0164148 A1 | 7/2011 | Akiyoshi et al. | |
| 2011/0313779 A1 | 12/2011 | Herzog et al. | |
| 2012/0113138 A1 | 5/2012 | Uusitalo et al. | |
| 2012/0200740 A1 | 8/2012 | Gum et al. | |

FOREIGN PATENT DOCUMENTS

| | | |
|---|---|---|
| CN | 102118555 A | 7/2011 |
| EP | 1879373 A1 | 1/2008 |
| EP | 1998260 A1 | 12/2008 |
| EP | 2157777 A1 | 2/2010 |
| JP | 2000-013722 A | 1/2000 |
| JP | 2005-005953 A | 1/2005 |
| JP | 2006-157810 A | 6/2006 |
| JP | 2007-281799 A | 10/2007 |
| JP | 2008-042887 A | 2/2008 |
| JP | 2008-085582 A | 4/2008 |
| JP | 4296451 B2 | 7/2009 |
| JP | 4468794 B2 | 5/2010 |
| JP | 2011-124812 A | 6/2011 |
| JP | 2011-141144 A | 7/2011 |
| KR | 10-2010-0022698 A | 3/2010 |
| WO | 2004/011881 A1 | 2/2004 |

OTHER PUBLICATIONS

Non-Final Office Action for U.S. Appl. No. 15/345,826, dated Mar. 24, 2017, 16 pages.
Notice of Allowance for U.S. Appl. No. 14/349,378, dated Sep. 13, 2016, 2 pages.
Notice of Allowance for U.S. Appl. No. 14/349,378, dated Jul. 29, 2016, 7 pages.
Non-Final Office Action for U.S. Appl. No. 14/349,378, dated Apr. 8, 2016, 12 pages.
Advisory Action for U.S. Appl. No. 14/349,378, dated Feb. 26, 2016, 3 pages.
Final Office Action for U.S. Appl. No. 14/349,378, dated Dec. 2, 2015, 15 pages.
Non-Final Office Action for U.S. Appl. No. 14/349,378, dated Jun. 18, 2015, 18 pages.
International Search Report and Written Opinion of PCT Application No. PCT/JP2012/006783, dated Feb. 11, 2013, 13 pages.
International Preliminary Report on Patentability of PCT Application No. PCT/JP2012/006783, dated Jun. 5, 2014, 10 pages.
Wikipedia-Control unit, downloaded from https://en.wikipedia.org/wiki/Control_unit on Jul. 19, 2016.
Toyama, et al., "Geographical Location Tags on Digital Images", Proceedings of the 11th. ACM International Conference on Multimedia MM 03, XP002420408, Nov. 2003, pp. 156-166.
Office Action for EP Patent Application No. 12795868.4, dated Jun. 25, 2019, 20 pages of Office Action.
Toyama, et al, "Geographic Location Tags on Digital Images", Proceedings of the Eleventh ACM International conference on Multimedia, Berkeley, CA, USA, Nov. 2-8, 2003, pp. 156-166.

* cited by examiner

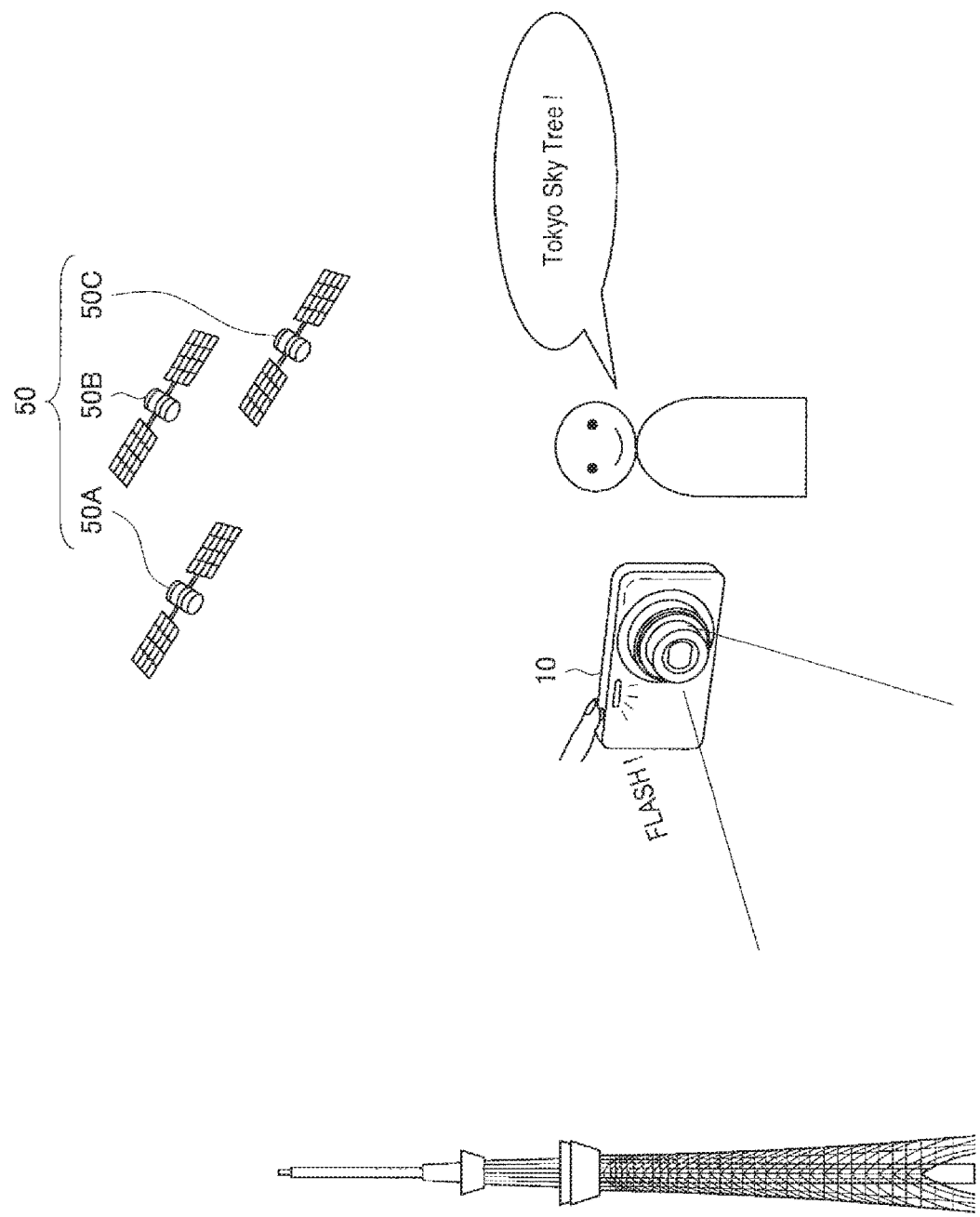
[Fig. 1]

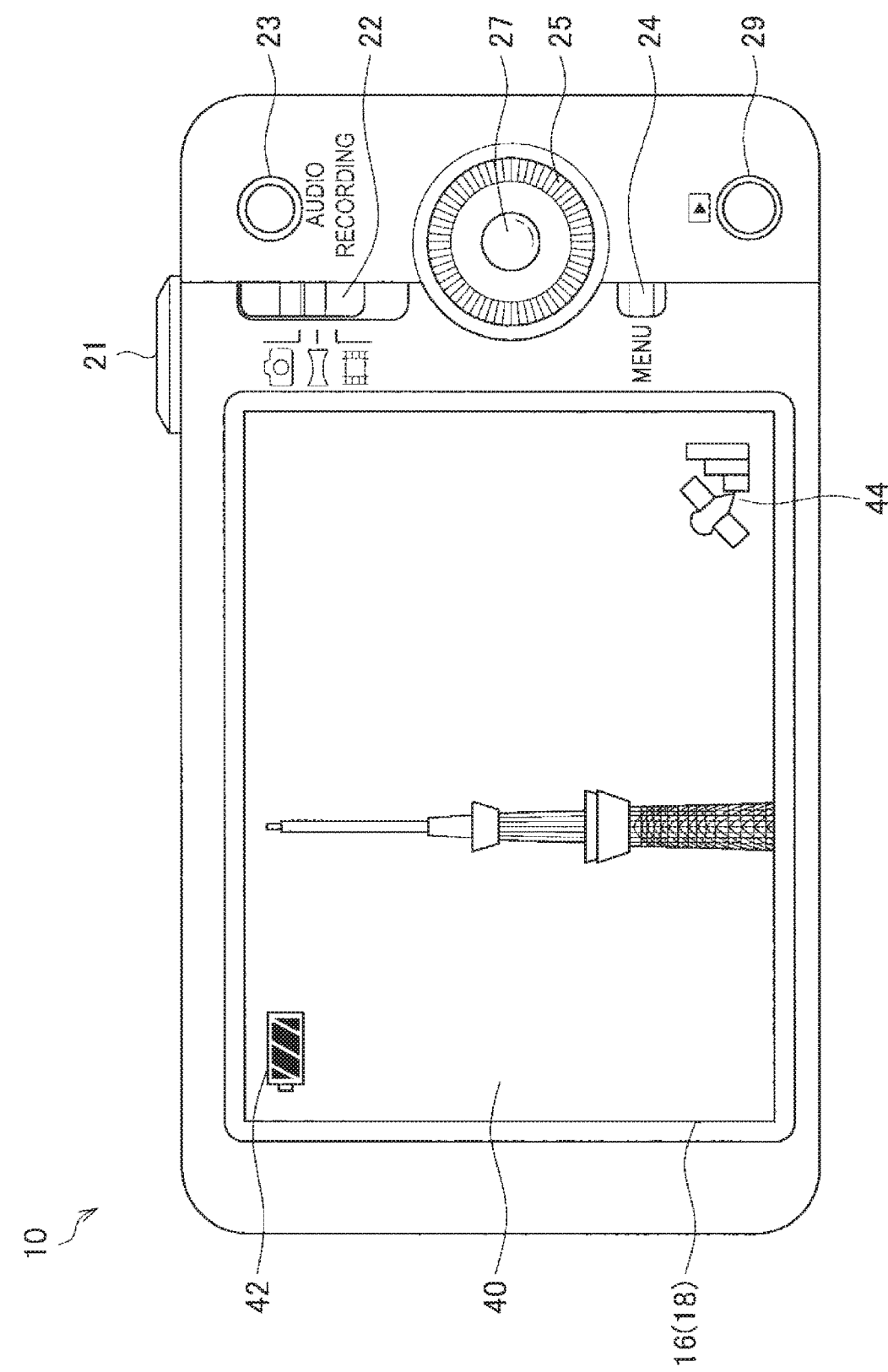
[Fig. 2]

[Fig. 3]
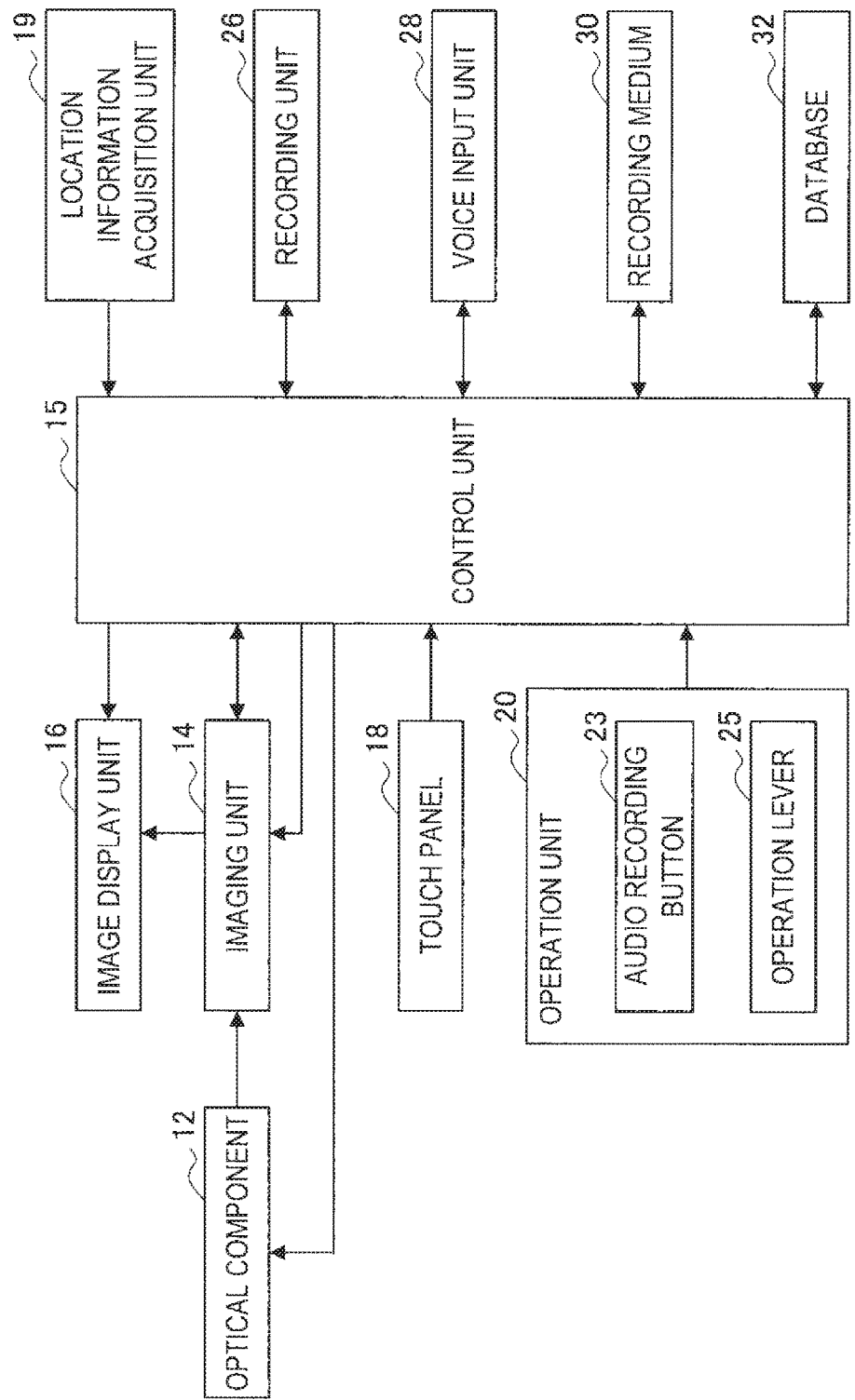

[Fig. 4]
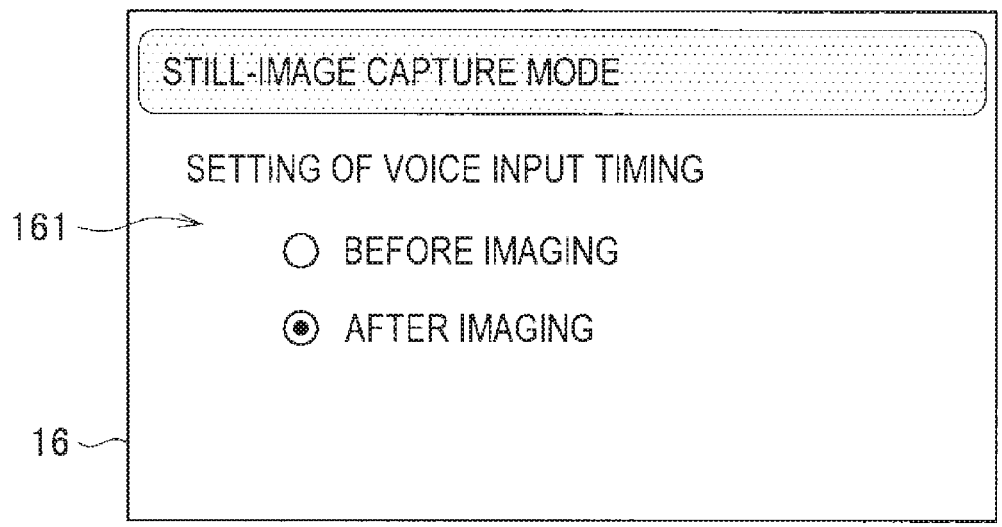
[Fig. 5]
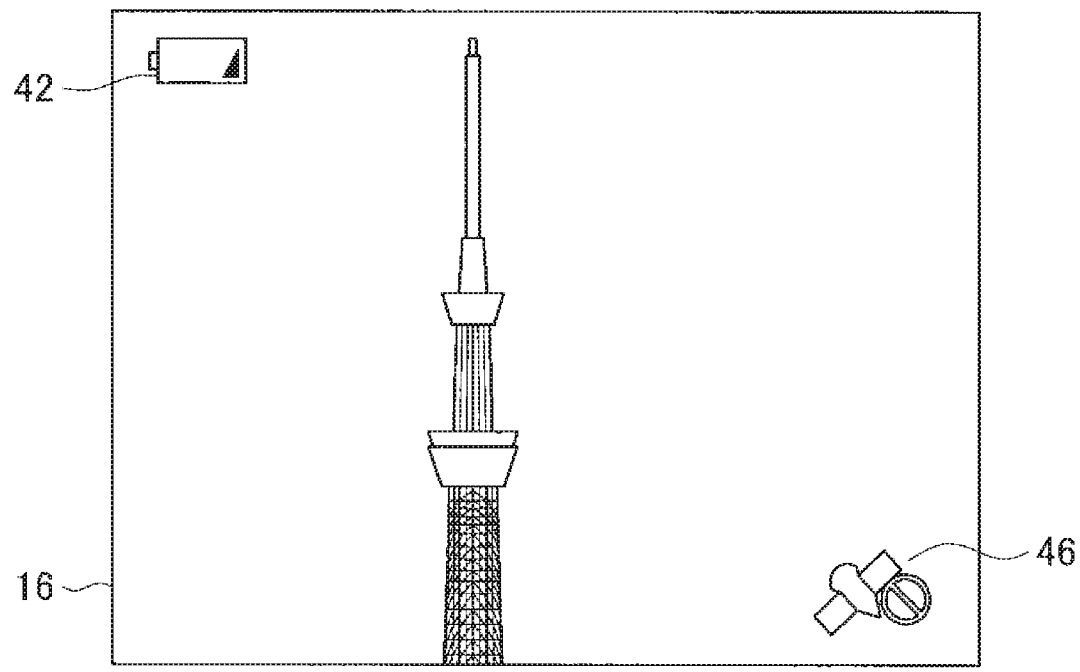

[Fig. 6]
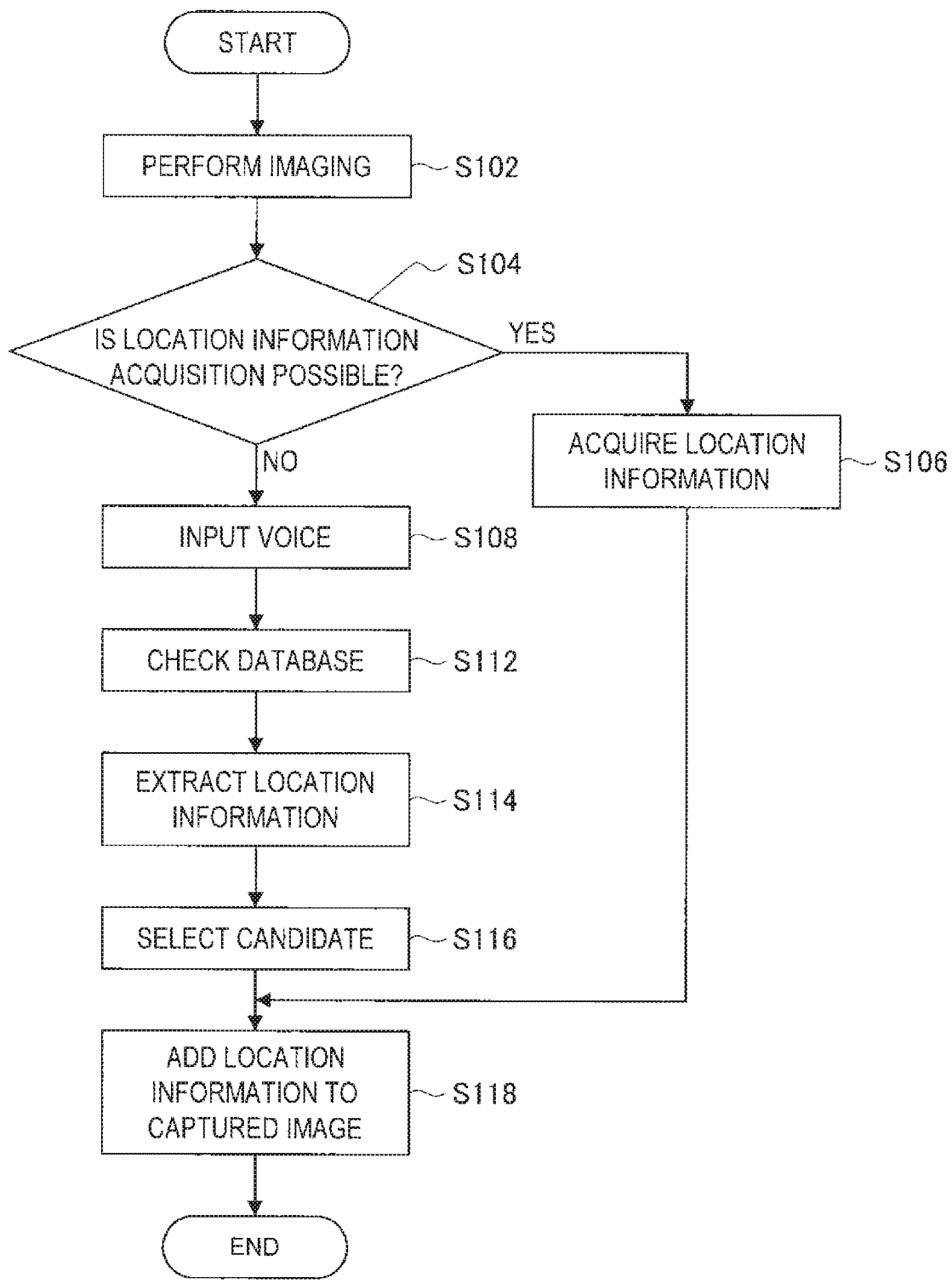

[Fig. 7]
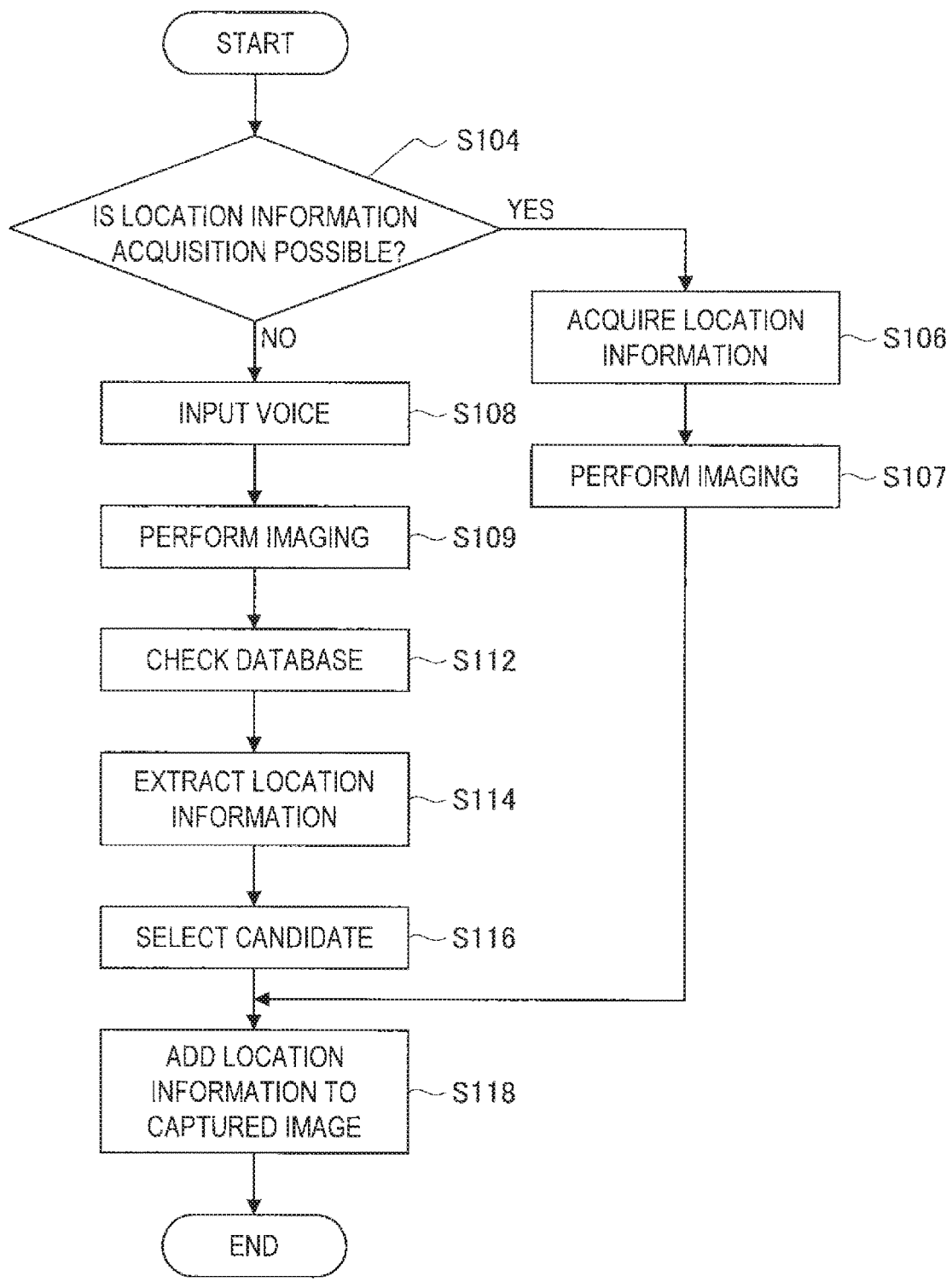

[Fig. 8]
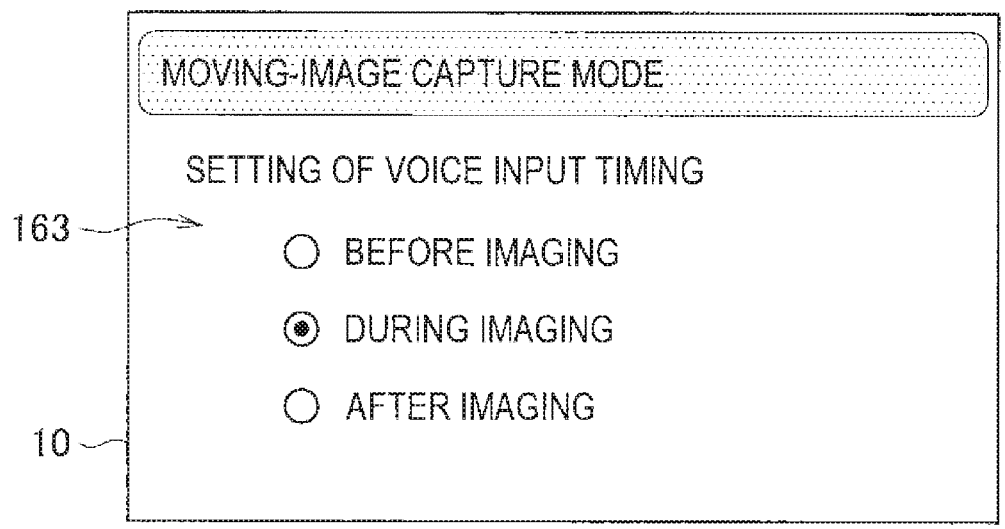

[Fig. 9]
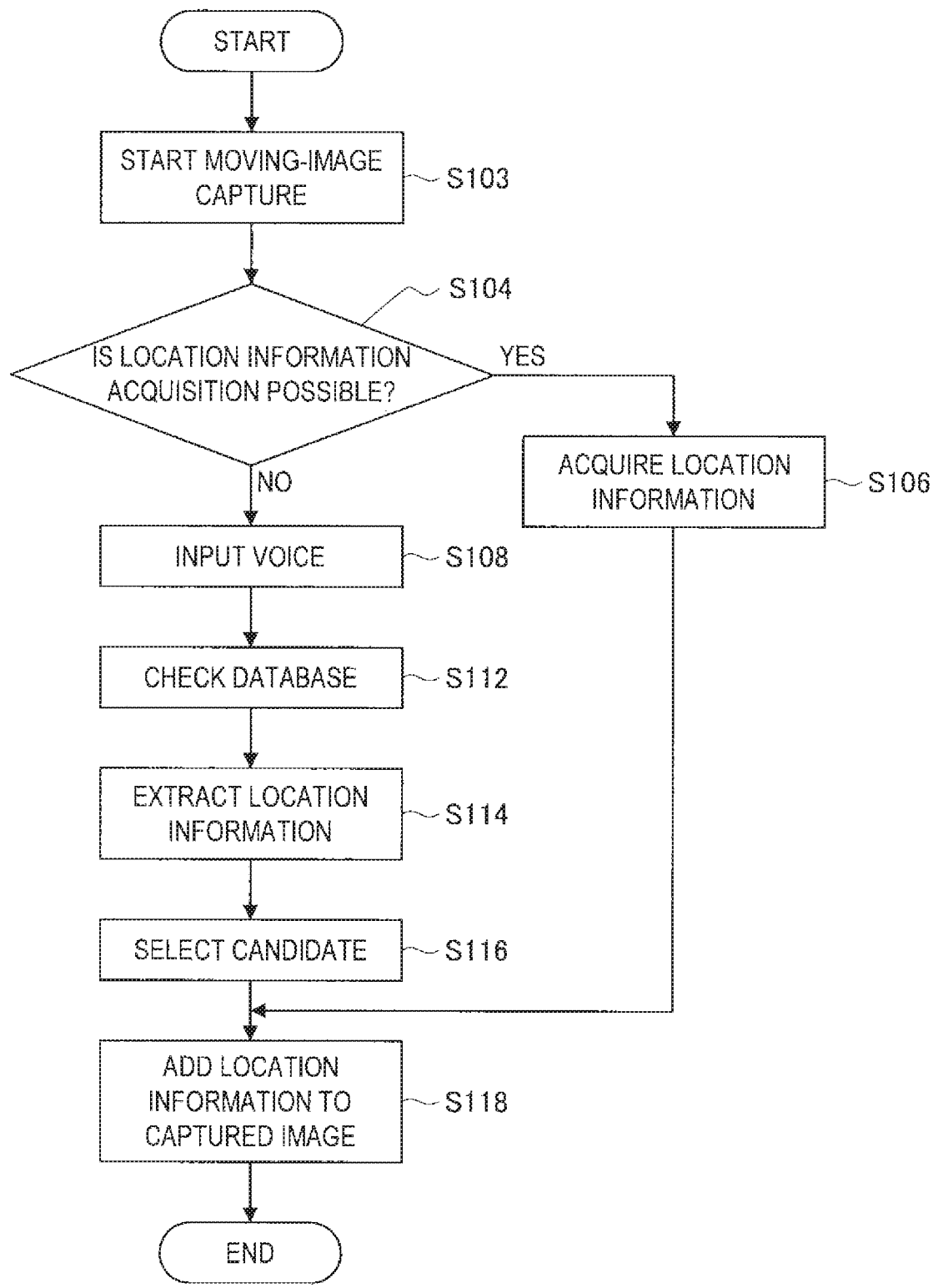

[Fig. 10]
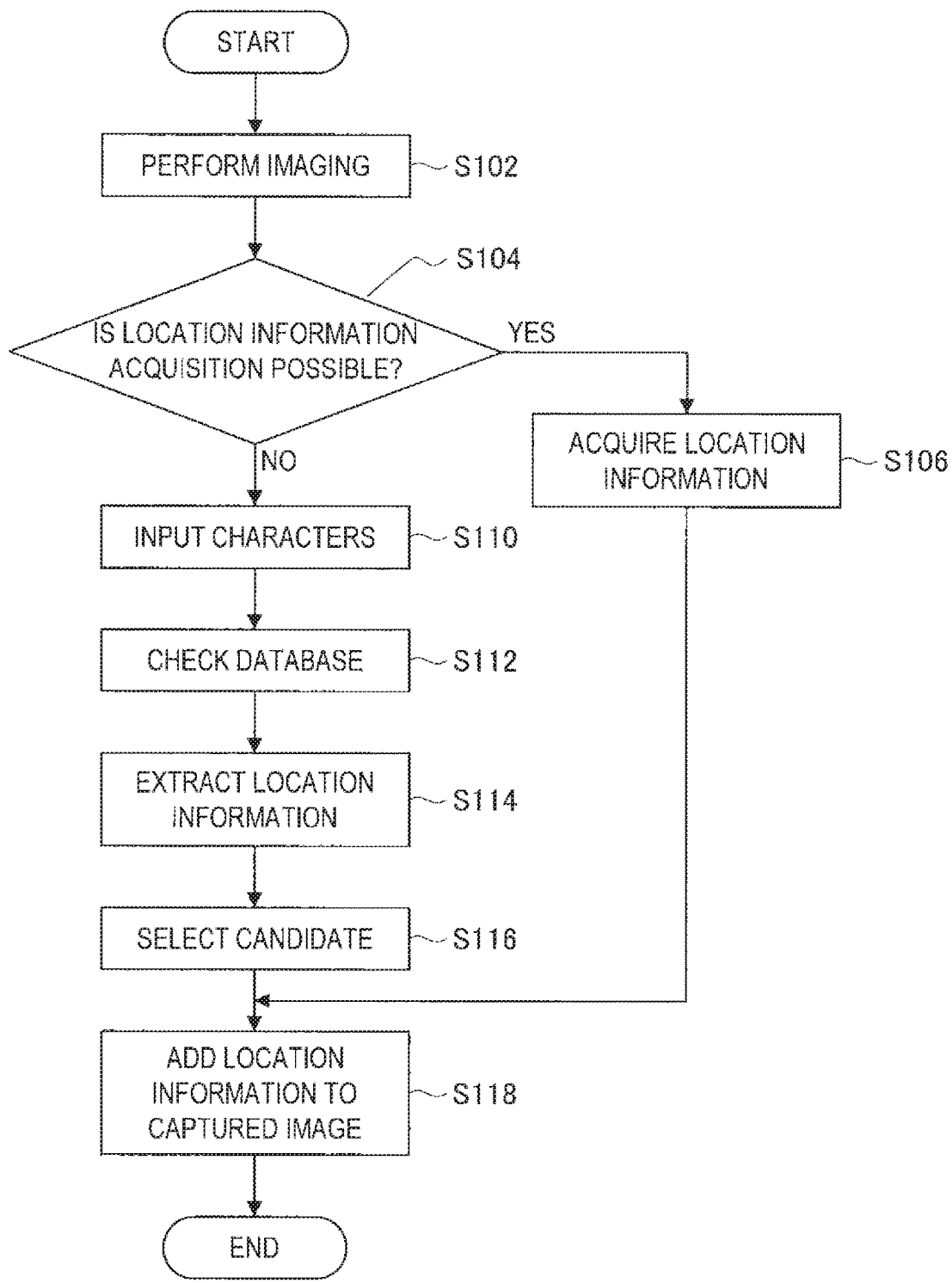

[Fig. 11]
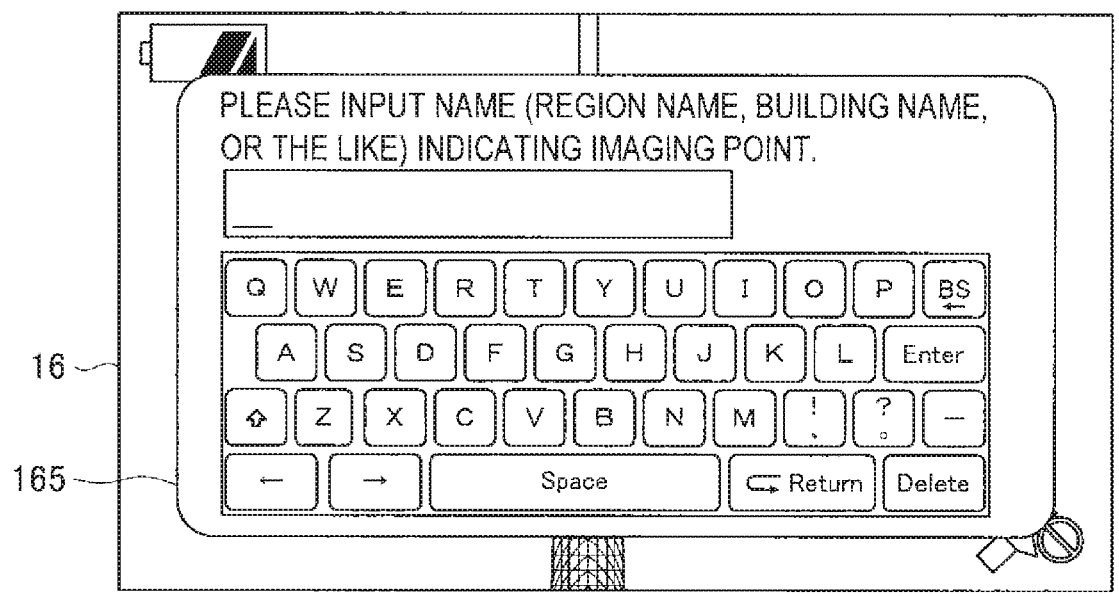

[Fig. 12]
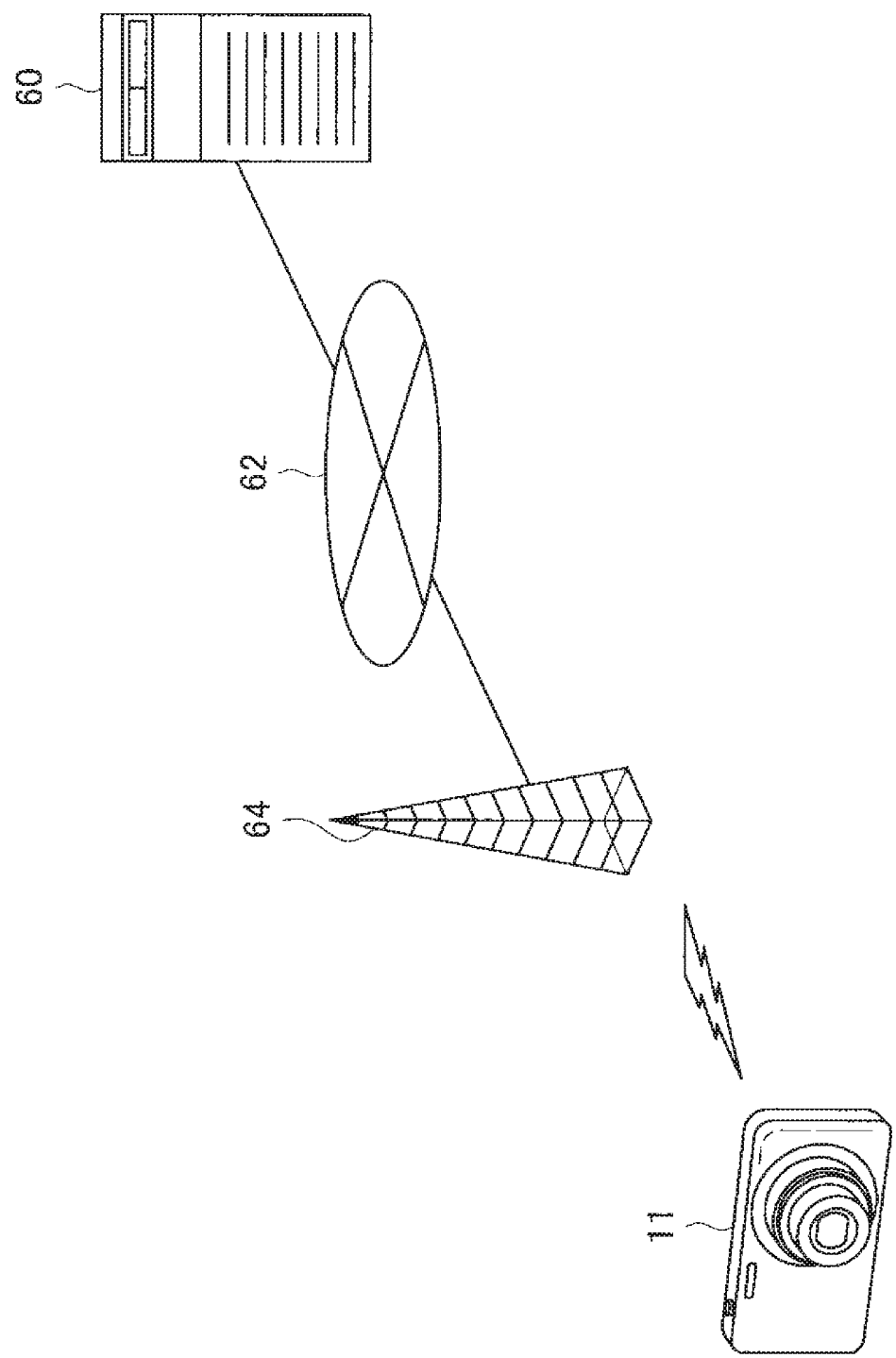

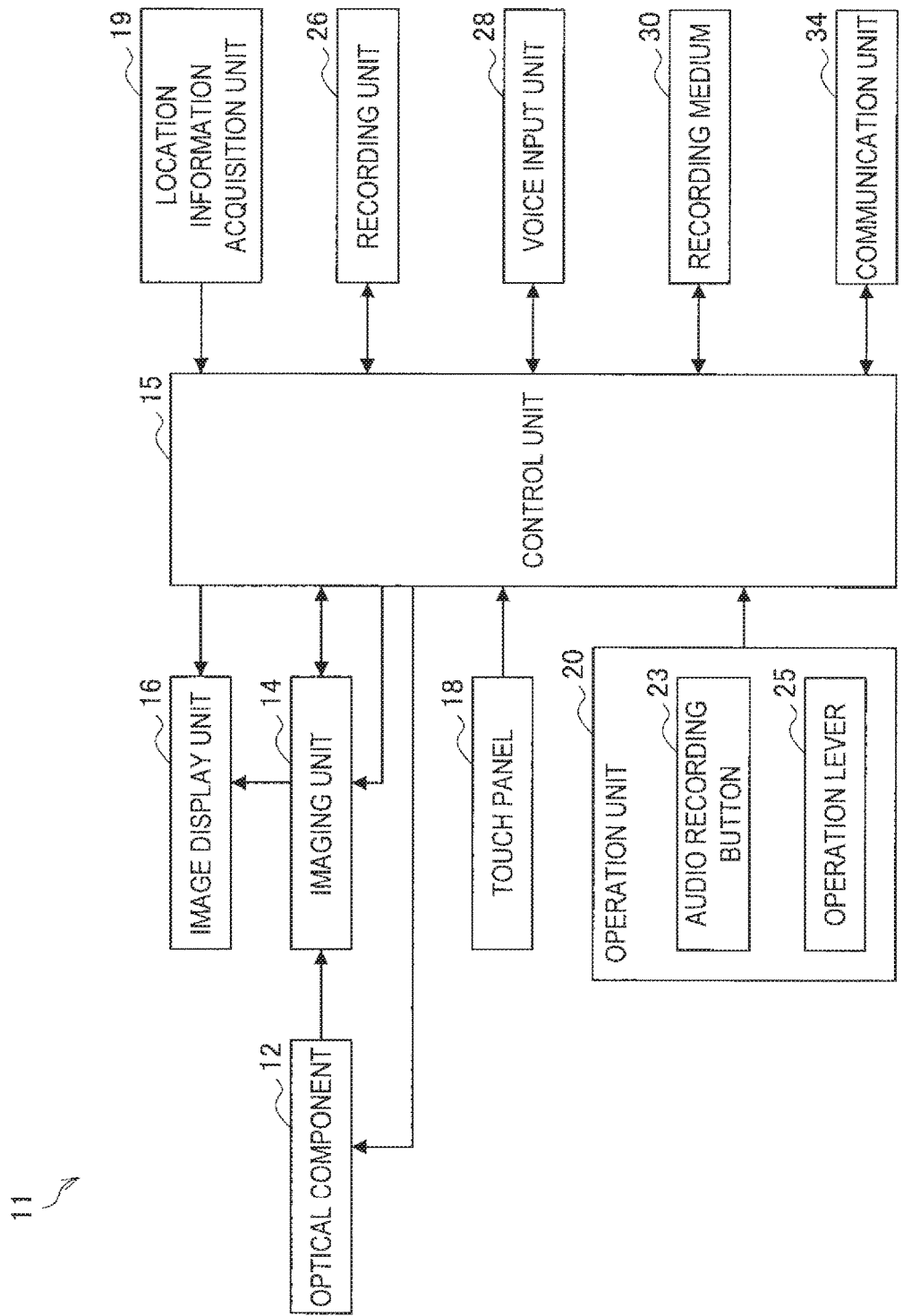

IMAGE PROCESSING APPARATUS, LOCATION INFORMATION ADDING METHOD

CROSS-REFERENCES TO RELATED APPLICATIONS

The present application is a continuation application of U.S. patent application Ser. No. 15/345,826, filed Nov. 8, 2016, which is a continuation application of U.S. patent application Ser. No. 14/349,378, filed Apr. 3, 2014, now U.S. Pat. No. 9,509,914, which is a National Stage Entry of U.S. Patent Application Serial No. PCT/JP2012/006783, filed Oct. 23, 2012, which claims the benefit of priority from prior Japanese Priority Patent Application 2011-253840 filed in the Japan Patent Office on Nov. 21, 2011, the entire contents of which are hereby incorporated by reference.

TECHNICAL FIELD

The present disclosure relates to an image processing apparatus, a location information adding method, and a program.

BACKGROUND ART

In general, additional information such as date and time information or location information during imaging is included in an image captured by an imaging apparatus. The additional information included in the image as described above is used when a large number of images are managed, for example, in an image management server. More specifically, for example, the image management server generates a file name based on the date and time information included in the image, and stores image data.

Here, the following patent literatures (PTLs) 1 to 3 are included as technology related to the generation of additional information to be included in an image.

In PTL 1, technology for selecting one piece of location information stored in a memory if location information has not been acquired during the imaging is disclosed.

In PTL 2, technology for setting location information obtained at a different point in time as imaging point information if location information has not been acquired during the imaging is disclosed.

In PTL 3, technology in which an image management server receiving an image from an imaging apparatus generates additional information by searching a map database using a keyword extracted based on voice or schedule information to be included in the image is disclosed.

CITATION LIST

Patent Literature

[PTL 1]
JP 2005-5953A
[PTL 2]
JP 2007-281799A
[PTL 3]
JP 2008-85582A

SUMMARY

Technical Problem

However, if no location information has been acquired during the imaging, it is difficult to generate accurate location information during imaging thereafter. For example, in the above-described PTL 1, because selection from the location information stored in advance in the memory of the imaging apparatus is performed, location information different from location information upon imaging is more likely to be selected.

In addition, in the above-described PTL 2, if it is not possible for an imaging apparatus to acquire location information for a while such as that it is not possible to quickly replace a battery after battery exhaustion inside a car on the move or indoors immediately after the move, there is a problem in that location information acquired by the imaging apparatus at a different point thereafter becomes location information regarding a point completely different from that upon imaging.

In addition, in PTL 3, the case in which it is not possible to acquire location information of an imaging point in the imaging apparatus is not considered. Further, in PTL 3, because additional information such as location information is generated in the image management server, it is not possible for a user to check an imaging history in real time in the middle of an outing.

It is desirable to provide a novel and improved image processing apparatus, location information adding method, and program, which enable location information of an imaging point to be acquired even when it is difficult to acquire location information based on an acquisition signal from an outside.

Solution to Problem

According to one exemplary embodiment, the disclosure is directed to an information processing apparatus comprising: a processor that acquires captured image data; determines whether a position determining unit of the information processing apparatus detects a location of the information processing apparatus; controls a user interface to prompt a user to enter information when it is determined that a location of the information processing apparatus has not been detected; and receives location information that is extracted based on a user input received at the user interface in response to the prompt.

The information processing apparatus may also include an imaging unit that captures the image data; and the position determining unit configured to detect the location of the information processing apparatus based on one or a plurality of received wireless signals, wherein the processor associates the acquired location information with the captured image data.

According to another exemplary embodiment, the disclosure is directed to a method performed by an information processing apparatus, the method comprising: acquiring captured image data; determining whether a position determining unit of the information processing apparatus detects a location of the information processing apparatus; controlling a user interface to prompt a user to enter information when it is determined that a location of the information processing apparatus has not been detected; and receiving location information that is extracted based on a user input received at the user interface in response to the prompt.

According to another exemplary embodiment, the disclosure is directed to a non-transitory computer-readable medium including computer program instructions, which when executed by an information processing apparatus, cause the information processing apparatus to perform a process comprising: acquiring captured image data; determining whether a position determining unit of the information processing apparatus detects a location of the information processing apparatus; controlling a user interface to prompt a user to enter information when it is determined that a location of the information processing apparatus has not been detected; and receiving location information that is extracted based on a user input received at the user interface in response to the prompt.

BRIEF DESCRIPTION OF DRAWINGS

FIG. 1 is a diagram illustrating an outline of a location information adding system according to the present disclosure.

FIG. 2 is an external appearance diagram of an imaging apparatus according to the present disclosure.

FIG. 3 is a block diagram illustrating a configuration of an imaging apparatus according to a first embodiment.

FIG. 4 is a diagram illustrating an example of a timing setting screen of a user's input in a still-image capture mode according to the first embodiment.

FIG. 5 is a diagram illustrating a display example of a global positioning system (GPS) icon according to the first embodiment.

FIG. 6 is a flowchart illustrating a location information adding process according to the first embodiment when the timing of the user's input is set to the timing after imaging.

FIG. 7 is a flowchart illustrating a location information adding process according to the first embodiment when the timing of the user's input is set to the timing before imaging.

FIG. 8 illustrates an example of a timing setting screen of the user's input in a moving-image capture mode according to the first embodiment.

FIG. 9 is a flowchart illustrating a location information adding process according to the first embodiment when the timing of the user's input is set to the timing during imaging.

FIG. 10 is a flowchart illustrating a location information adding process when the user's input is a character input and the timing of the user's input is set to the timing after imaging.

FIG. 11 is a diagram illustrating an example of a character group (software keyboard image) displayed on an image display unit.

FIG. 12 is a diagram illustrating an entire configuration of a location information adding system according to a second embodiment.

FIG. 13 is a block diagram illustrating a configuration of an imaging apparatus according to the second embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. Overview of Imaging Apparatus According to Present Disclosure
2. Embodiments According to Present Disclosure
2-1. First Embodiment
2-2. Second Embodiment
3. Conclusion Technology according to the present disclosure described herein can be implemented in various forms as will be described with reference to the above-described items of "1. Overview of Imaging Apparatus According to Present Disclosure" and "2. Embodiments According to Present Disclosure." In addition, an image processing apparatus 10 according to an embodiment of the present disclosure includes:

(A) a first acquisition unit (a location information acquisition unit 19) for acquiring location information based on an acquisition signal from an outside, (B) a second acquisition unit (a voice input unit 28 and a touch panel 18) for acquiring location information based on a user's input, and (C) an addition unit (a control unit 15) for adding the location information acquired by the first acquisition unit to a captured image, (D) wherein the addition unit adds the location information acquired by the second acquisition unit to the captured image if the location information has not been acquired by the first acquisition unit.

1. Overview of Imaging Apparatus According to Present Disclosure

Here, after an outline of the location information adding system according to the present disclosure is described with reference to FIG. 1, the overview of the imaging apparatus according to the present disclosure will be described with reference to FIG. 2.

FIG. 1 is a diagram illustrating an outline of a location information adding system according to the present disclosure. As illustrated in FIG. 1, the location information adding system according to the present disclosure includes the imaging apparatus 10 and artificial satellites 50A to 50C.

The imaging apparatus 10 according to the present disclosure has a function of imaging an imaging target according to the user's operation. The imaging apparatus 10 has a function of adding location information indicating an imaging point (a current location of its own apparatus) to a captured image. Hereinafter, the acquisition of the location information by the imaging apparatus 10 according to the present disclosure will be described.

The imaging apparatus 10 according to the present disclosure has a global positioning system (GPS) receiver (see the location information acquisition unit 19 illustrated in FIG. 3) for calculating (measuring) a current location by receiving navigation messages transmitted from the artificial satellites 50A to 50C. Although capital letters are affixed after reference numerals as in the artificial satellites 50A to 50C so as to distinguish the artificial satellites in FIG. 1, the artificial satellites 50A to 50C are collectively referred to as an artificial satellite 50 when it is not necessary to specifically distinguish each artificial satellite.

The artificial satellite 50 (GPS satellite) orbits over the earth. Although only the three artificial satellites 50A to 50C are illustrated in FIG. 1, for example, four artificial satellites are located in each of six orbits and a total of 24 artificial satellites orbit over the earth. In addition, the artificial satellite 50 transmits a navigation message including orbital information of the artificial satellite, a transmission time of the navigation message, or the like. A GPS receiver provided in the imaging apparatus 10 can receive navigation messages transmitted from three or more artificial satellites, for example, the artificial satellites 50A to 50C, and measure a current location of its own apparatus based on the received navigation messages.

The imaging apparatus 10 according to the present disclosure can add location information measured by the GPS receiver (location information acquisition unit 19) to the captured image as described above.

However, it is difficult for the GPS receiver to measure a current location in a place in which a radio wave from the artificial satellite 50 is interrupted and reflected such as indoors, behind a building, between high-rise buildings, on a narrow road between buildings, underground, or under an elevated railroad. If it is not possible for the GPS receiver to measure the current location, the imaging apparatus 10 according to the present disclosure acquires location information based on the user's input. For example, as illustrated in FIG. 1, the imaging apparatus 10 searches a database for a location information search based on a building name or a region name input by the user, and acquires the location information of its own apparatus.

As described above, if the GPS receiver has not acquired the location information, the imaging apparatus 10 according to the present disclosure can acquire the location information based on the user's input, and add the acquired location information to a captured image. The acquisition of the location information based on the user's input will be described in detail with reference to "2. Embodiments."

Next, the overview of the imaging apparatus according to the present disclosure will be described with reference to FIG. 2. FIG. 2 is an external appearance diagram of the imaging apparatus 10 according to the present disclosure. As illustrated in FIG. 2, the imaging apparatus 10 includes various operation units such as a shutter button 21, a mode switch 22, an audio recording button 23, a menu button 24, an operation lever 25, a determination button 27, a play button 29, and an image display unit 16 on which the touch panel 18 is stacked.

The shutter button 21 is an operation unit that starts/ends still-image capture and moving-image capture. The mode switch 22 is a slide type operation unit that switches an imaging mode of the imaging apparatus 10. For example, the mode is switched to a still-image capture mode when the mode switch 22 is positioned at an upper end, switched to a panorama capture mode when the mode switch 22 is positioned at the center, and switched to a moving-image capture mode when the mode switch 22 is positioned at a lower end.

The audio recording button 23 is an operation unit that starts/stops voice recording. The audio recording button 23 according to the present disclosure is used by the user to input a place name or a facility name indicating an imaging place so as to acquire location information.

The menu button 24 is an operation unit for causing the image display unit 16 to display a setting screen (not illustrated) of a function available during imaging or during playback. If the setting screen is displayed by pressing the menu button 24, the user performs various setting operations by the operation lever 25 and the determination button 27.

The wheel type operation lever 25 is an operation unit for selecting an item on the screen. The user can select the item by turning the wheel of the operation lever 25 or pressing the wheel in an upward, downward, left, or right direction. The determination button 27 is an operation unit for executing the selected item. The play button 29 is an operation unit that switches the operation mode of the imaging apparatus 10 to a still/moving-image playback mode.

The image display unit 16 displays a screen corresponding to the operation mode (imaging mode/playback mode) of the imaging apparatus 10. For example, during the imaging mode, a captured screen 40, a battery icon 42, and a GPS icon 44 are displayed as illustrated in FIG. 2. The captured screen 40 is a screen captured by an imaging lens (not illustrated) provided on a side opposite the side of the image display unit 16 of the imaging apparatus 10 illustrated in FIG. 2. The battery icon 42 is an icon indicating the remaining battery power of the imaging apparatus 10. The GPS icon 44 indicates a state of measurement by a GPS. The GPS icon 44 illustrated in FIG. 2 indicates a state in which radio waves are being received from three or more artificial satellites and location information can be acquired (measurement is possible).

As described above, the user can recognize the state of the imaging apparatus 10 according to the battery icon 42 or the GPS icon 44 displayed on the image display unit 16. Consequently, for example, if the GPS icon indicating that measurement by the GPS is not possible is displayed on the image display unit 16, the user can perform a voice input for a place name, a facility name, or the like by pressing the audio recording button 23. Thereby, even when the acquisition of location information by the GPS is not possible, the imaging apparatus 10 can acquire the location information based on the user's input (here, the voice input as an example).

The overview of the imaging apparatus 10 according to the present disclosure has been described above. As described above, the imaging apparatus 10 according to the present disclosure adds location information acquired based on the GPS or the user's input to a captured image. Hereinafter, the addition of the location information by the imaging apparatus 10 will be described in detail using a plurality of embodiments.

2. Embodiments (2-1. First Embodiment)

The imaging apparatus 10 according to the first embodiment searches a database provided in the imaging apparatus 10 based on a region name or a facility name input by the user and acquires location information if location information acquisition by the GPS is difficult. Hereinafter, the configuration of the imaging apparatus 10 will be described with reference to FIG. 3.

(Configuration of Imaging Apparatus 10 According to First Embodiment)

FIG. 3 is a block diagram illustrating the configuration of the imaging apparatus 10 according to the first embodiment. As illustrated in FIG. 3, the imaging apparatus 10 according to this embodiment includes an optical component 12, an imaging unit 14, an image display unit 16, the touch panel 18, an operation unit 20, the control unit 15, the location information acquisition unit 19, a recording unit 26, a voice input unit 28, a recording medium 30, and a database 32.

The optical component 12 includes a zoom lens and an imaging lens that collect light coming from an object. In addition, the optical component 12 is controlled by the control unit 15 according to a zoom operation of the user, and a focal length is shortened or lengthened. Thereby, an image of the object formed on the imaging unit 14 is reduced/enlarged.

The imaging unit 14 is a signal conversion unit such as a charge coupled device (CCD) or complementary metal oxide semiconductor (CMOS), and the image of the object is formed by the optical component 12. If the image of the object is formed on the signal conversion unit, the signal conversion unit converts the image of the object into an electrical image signal. In addition, the imaging unit 14 is controlled by the control unit 15 according to the user's operation that switches the imaging mode, and outputs an image signal of one of a still image, a panorama, and a moving image to the control unit 15. In addition, the imaging unit 14 outputs the image signal (captured image) subjected to the conversion to the image display unit 16.

The image display unit 16 can display the captured image converted by the imaging unit 14 from the image of the object of which the light is collected by the optical component 12 in the imaging mode. In addition, the image display unit 16 can display an index screen or a playback screen in the playback mode.

As an example of an operation display unit, the touch panel 18 is stacked and provided on the image display unit 16 as described above. The user can input various instructions or information to the imaging apparatus 10 by operating the touch panel 18. In addition, the touch panel 18 according to this embodiment can input characters indicating a region name or a facility name as the user's input for acquiring location information of an imaging point in the still-image, panorama, and moving-image capture modes.

The operation unit 20 includes various operation units (the shutter button 21, the mode switch 22, the audio recording button 23, the menu button 24, and the operation lever 25) described with reference to FIG. 2. In FIG. 3, the audio recording button 23 and the operation lever 25 are representatively illustrated.

The control unit 15 controls elements provided in the imaging apparatus 10. In addition, the control unit 15 executes various controls using a random access memory (RAM) or a buffer memory as a work area according to a control program stored in a read only memory (ROM) as will be described later. In addition, the control unit 15 performs control corresponding to the user's operation. For example, the control unit 15 according to this embodiment starts recording of voice input from the voice input unit 28 when the audio recording button 23 has been pressed. In addition, the control unit 15 according to this embodiment can search the database 32 based on a region name or a facility name input from the voice input unit 28 or the touch panel 18, and extract location information from the database 32. Further, the control unit 15 according to this embodiment controls the addition of location information indicating an imaging point to a captured image.

The location information acquisition unit 19 is a first acquisition unit that acquires location information based on an acquisition signal from an outside. More specifically, the location information acquisition unit 19 according to the present disclosure is a GPS receiver that receives a navigation message, which is an example of the acquisition signal from the outside, transmitted from the above-described artificial satellite 50, and calculates (measures) a current location. In addition, the location information acquisition unit 19 outputs the location information indicating the measured current location to the control unit 15. In addition, the location information acquisition unit 19 may acquire the location information constantly (or at regular intervals) while the GPS setting is ON.

The recording unit 26 is a recording medium such as the RAM or ROM. For example, the RAM is used as a work area of the control unit 15. In addition, for example, a program for controlling the optical component 12, the imaging unit 14, and the image display unit 16 or a program for executing recording control and playback control of an image signal or a voice signal is written to the ROM.

The voice input unit 28 collects voice around an object in the moving-image capture mode. The voice input unit 28 has a function (voice processing unit) of converting the voice collected by a voice collection unit (microphone) (not illustrated) into an electrical voice signal. In addition, the voice input unit 28 performs a process such as a correction or automatic gain control (AGC) process for the voice signal based on a control signal from the control unit 15, and a process of converting the voice signal into a digital form. The voice input unit 28 according to the present disclosure collects the user's voice as the user's input for location information acquisition of an imaging point in the still-image, panorama, and moving-image capture modes. In this case, the voice input unit 28 performs a process of recognizing the collected voice signal, converting the recognized voice signal into character data, and outputting the character data to the control unit 15 as the user's input information.

The above-described microphone may be embedded in the imaging apparatus 10 or attached to an outer portion.

The recording medium 30 is a memory card to which compressed data of a captured image encoded by the control unit 15 is written, and the like. In addition, the compressed data of the image read from the recording medium 30 is decoded by the control unit 15 and displayed on the image display unit 16.

The database 32 is a database for a location information search. More specifically, the database 32 holds "location information" such as latitude, longitude, altitude, and an address associated with "names" such as a region name, a building name, a facility name, a proper name, and a common name. Thereby, the control unit 15 can search the database 32 based on a name such as a region name input from the user, and extract location information associated with the name.

The configuration of the imaging apparatus 10 according to the first embodiment has been described above. Next, the timing of the user's input for location information acquisition will be described with reference to the drawings.

(Timing Setting of User's Input)

As described above, the imaging apparatus 10 according to this embodiment adds location information indicating an imaging point to a captured image. Although the location information added to the captured image is usually location information acquired by the location information acquisition unit 19 using the GPS, the imaging apparatus 10 acquires location information based on the user's input if the location information acquisition unit 19 has not acquired the location information. For the user's input, the user inputs a region name, a building name, or a facility name indicating an imaging point by voice.

The timing of the user's input may be one of timings before the imaging operation, during the imaging operation, and after the imaging operation. In addition, the timing of the user's input may be set to one of the timings described above according to the specs of the imaging apparatus 10, and the user may arbitrarily set one described above. The case in which the user arbitrarily sets the timing of the user's input will be described with reference to FIG. 4.

FIG. 4 is a diagram illustrating an example of a timing setting screen of the user's input in the still-image capture mode. According to an operation of the menu button 24 or the like, the control unit 15 displays a setting screen 161 on the image display unit 16 as illustrated in FIG. 4. The setting screen 161 includes selection items of "before imaging" and "after imaging," and each selection item can be selected by a radio button. In addition, even in the panorama capture mode in which a plurality of still images are connected to implement a panorama view angle, the timing of the user's input is equally set according to a setting screen (not illustrated) including the selection items of "before imaging" and "after imaging." As described above, in the still-image capture mode and the panorama capture mode (hereinafter collectively referred to as a still-image capture mode), the timing of the user's input can be set after or before the imaging.

In addition, in the moving-image capture mode, the timing of the user's input can be set to one of timings before the imaging, during the imaging, and after the imaging. The timing setting of the user's input in the moving-image capture mode will be described in detail with reference to the "moving-image capture mode" to be described later.

The control unit 15 may display a GPS icon indicating a location information acquisition state of the location information acquisition unit 19 on the display unit 16 according to the set timing of the user's input. Here, a display example of the GPS icon according to this embodiment is illustrated in FIG. 5.

As illustrated in FIG. 5, if location information acquisition by the location information acquisition unit 19 is difficult, for example, because the location information acquisition unit 19 is set to be inactive due to a small battery capacity (see the battery icon 42), the GPS icon 46 indicating this fact is displayed on the image display unit 16. More specifically, the GPS icon 46 is displayed before the imaging when the timing of the user's input is set to the timing "before imaging," displayed along with an image during the imaging when the timing of the user's input is set to the timing "during imaging," and displayed along with a captured image when the timing of the user's input is set to the timing "after imaging." Thereby, the imaging apparatus 10 can prompt the user to perform the user's input for location information.

The timing setting of the user's input has been described above. Next, the location information adding process of the imaging apparatus 10 according to this embodiment will be described.

(Location-Information Adding Process of Imaging Apparatus 10 According to First Embodiment)

The imaging apparatus 10 according to this embodiment adds location information to a captured image based on the user's input if the location information acquisition unit 19 has not acquired the location information. Here, the timing of the user's input for acquiring the location information is the timing before/after imaging in the still-image capture mode, and is the timing before/during/after imaging in the moving-image capture mode. Hereinafter, the location information adding process according to this embodiment will be described in detail according to the timing setting of the user's input.

(Still-Image Capture Mode)

Here, the case in which the timing of the user's input is set to the timing after or before imaging in the still-image capture mode will be described with reference to each flowchart.

After Imaging

FIG. 6 is a flowchart illustrating the location information adding process according to this embodiment when the timing of the user's input is set to the timing after the imaging. As illustrated in FIG. 6, first, in step S102, if the user presses the shutter button 21, the control unit 15 of the imaging apparatus 10 performs an imaging operation by controlling the optical component 12 and the imaging unit 14.

Then, in step S104, the control unit 15 determines whether or not location information acquisition by the location information acquisition unit 19 is possible. Here, the location information acquisition unit 19 constantly acquires location information if the GPS setting is ON. Consequently, the control unit 15 determines whether or not the location information acquisition unit 19 is in a state in which the location information acquisition is possible at a point in time immediately after the imaging.

Next, if the location information acquisition is determined to be possible, the control unit 15 acquires the location information by the location information acquisition unit 19 in step S106, and subsequently the control unit 15 adds the location information to the captured image and stores the image in the recording unit 26 or the recording medium 30 in step S118.

On the other hand, if the location information acquisition is determined not to be possible in step S104 described above, a voice input indicating an imaging point is performed, the voice input unit 28 recognizes the input voice, converts the recognized voice into character data, and outputs the character data to the control unit 15 as the user's input information in step S108. Here, as described above, the control unit 15 may prompt the user to perform the voice input by displaying the GPS icon 46 indicating that the location information acquisition by the location information acquisition unit 19 is not possible on the image display unit 16 along with a captured image or displaying candidates for an imaging point based on location information capable of ultimately being acquired. In addition, for the voice input by the user, the voice of the user who speaks a region name, a facility name, or the like indicating an imaging point is input from a microphone (not illustrated), for example, when the audio recording button 23 has been pressed. The control unit 15 may select the location information capable of being ultimately acquired as the user's input information. Further, in voice recognition, the voice input based on the location information capable of being ultimately acquired may be recognized and converted into character data.

Then, in step S112, the control unit 15 searches the database 32 based on the user's input information output from the voice input unit 28. In step S114, the control unit 15 extracts location information associated with the user's input information (names indicating imaging points such as a region name and a facility name) from the database 32.

Here, if there are a plurality of pieces of location information extracted from the database 32, the control unit 15 displays the plurality of pieces of location information on the image display unit 16, and allows the user to select one of the plurality of pieces of location information in step S116. In addition, if the location information extracted from the database 32 is a region of a broad range, the control unit 15 may perform automatic selection from main place names of the region, and equally display a plurality of candidates on the image display unit 16 to allow the user to perform the selection.

Subsequently, in step S118, the control unit 15 adds the location information to a captured image, and stores the image in the recording unit 26 or the recording medium 30.

The location information adding process when the timing of the user's input is set to the timing after the imaging in the still-image capture mode has been described above in detail. Subsequently, the location information adding process when the timing of the user's input is set to the timing before the imaging in the still-image capture mode will be described with reference to FIG. 7.

Before Imaging

FIG. 7 is a flowchart illustrating the location information adding process according to this embodiment when the timing of the user's input is set to the timing before the imaging. The same processes as in the steps illustrated in FIG. 6 among steps illustrated in FIG. 7 are denoted by the same step numerals.

As illustrated in FIG. 7, first, in step S104, the control unit 15 determines whether or not location information acquisition by the location information acquisition unit 19 is possible. Here, as described above, the location information acquisition unit 19 constantly acquires location information if the GPS setting is ON. Consequently, the control unit 15 makes the determination of step S104 at a point in time before the imaging, for example, if the operation mode of the imaging apparatus 10 has been switched to the imaging mode.

Next, if the location information acquisition is determined to be possible, the control unit 15 acquires the location information by the location information acquisition unit 19 in step S106, and then performs an imaging operation in step S107. In step S118, the control unit 15 adds the location information to a captured image, and stores the image in the recording unit 26 or the recording medium 30.

On the other hand, if the location information acquisition is determined not to be possible in step S104 described above, a voice input indicating an imaging point is performed, and the voice input unit 28 recognizes the input voice, converts the recognized voice into character data, and outputs the character data to the control unit 15 as the user's input information in step S108. As described above, the control unit 15 may prompt the user to perform the voice input by displaying the GPS icon 46.

Next, if the user presses the shutter button 21 in step S109, the control unit 15 of the imaging apparatus 10 performs an imaging operation by controlling the optical component 12 and the imaging unit 14.

Subsequently, the control unit 15 performs the same process as in the above-described steps S112 to S118 illustrated in FIG. 6, and adds the location information to the captured image.

The location information adding process when the timing of the user's input is set to the timing before the imaging in the still-image capture mode has been described above in detail. Although the voice input in step S108 illustrated in FIGS. 6 and 7 is performed before/after the imaging operation, it is not necessary to constantly perform the voice input before/after each imaging operation in the embodiments according to the present disclosure. For example, when the imaging is continuously performed or when a plurality of imaging operations are performed in the same place, the control unit 15 may store location information acquired based on the user's input in the recording unit 26, and thereafter may add the location information stored in the recording unit 26 to captured images for a given time.

(Moving-Image Capture Mode)

Next, the location information adding process in the moving-image capture mode will be described. In the moving-image capture mode, it is possible to set the timing of the user's input to the timing before/during/after imaging as described above. First, the timing setting of the user's input in the moving-image capture mode will be described with reference to FIG. 8.

FIG. 8 is a diagram illustrating an example of a timing setting screen of the user's input in the moving-image capture mode. According to an operation of the menu button 24 or the like, the control unit 15 displays a setting screen 163 on the image display unit 16 as illustrated in FIG. 8. The setting screen 163 includes selection items of "before imaging," "during imaging," and "after imaging," and each selection item can be selected by a radio button. As described above, the user can arbitrarily set the timing of the user's input from the setting screen 163. Hereinafter, the location information adding process corresponding to the timing setting of the user's input will be described.

Before/after Imaging

Because the location information adding process when the timing of the user's input is set to the timing "before imaging" or "after imaging" is the same as in the above-described still-image capture mode, a brief description will be given here. That is, the control unit 15 according to this embodiment determines whether or not location information acquisition by the location information acquisition unit 19 is possible before the start of the imaging/after the end of the imaging. If the acquisition by the location information acquisition unit 19 is determined not to be possible, location information is acquired based on a voice input by the user and added to a captured image.

During Imaging

Next, the location information adding process according to this embodiment when the timing of the user's input is set to the timing "during imaging" in the moving-image capture mode will be described with reference to FIG. 9

FIG. 9 is a flowchart illustrating the location information adding process according to this embodiment when the timing of the user's input is set to the timing during the imaging. The same processes as in the steps illustrated in FIG. 6 among steps illustrated in FIG. 9 are denoted by the same step numerals.

As illustrated in FIG. 9, first, in step S103, the control unit 15 of the imaging apparatus 10 starts moving-image capture by controlling the optical component 12 and the imaging unit 14 if the user presses the shutter button 21.

Then, in step S104, the control unit 15 determines whether or not location information acquisition by the location information acquisition unit 19 is possible. Here, the location information acquisition unit 19 constantly acquires location information if the GPS setting is ON. Consequently, during the imaging, the control unit 15 determines whether or not the location information acquisition unit 19 is in a state in which the location information acquisition is possible.

Next, if the location information acquisition is determined to be possible, the control unit 15 acquires location information by the location information acquisition unit 19 in step S106, and subsequently the control unit 15 adds the location information to a captured image during the imaging or after the end of the imaging and stores the image in the recording unit 26 or the recording medium 30 in step S118.

On the other hand, if the location information acquisition is determined not to be possible in step S104 described above, the control unit 15 performs the same process as in the above-described steps S108 and S112 to S118 illustrated in FIG. 6, adds the location information to the captured image during the imaging or after the end of the imaging, and stores the image in the recording unit 26 or the recording medium 30.

Here, during the moving-image capture, in addition to the imaging by the imaging unit 14, voice is normally collected constantly from a microphone (not illustrated). In this embodiment, voice recognition of a voice part determined to be a voice input for acquiring location information is performed in voice collection that is constantly performed, and the recognized voice part is output to the control unit 15 as the user's input information. In addition, in order to clarify the voice input for acquiring the location information, for example, the voice recognition may be started by designating the pressing of the audio recording button 23 as a trigger, and character data subjected to conversion may be output to the control unit 15 as the user's input information.

The location information adding process when the timing of the user's input has been set to the timing during the imaging in the moving-image capture mode has been described above in detail.

Although the voice input has been described as an example of the user's input in the above-described flowchart, the embodiment according to the present disclosure is not limited thereto. For example, the user's input may be a character input. Hereinafter, the location information adding process according to this embodiment in an example of the character input as the user's input will be described with reference to FIGS. 10 and 11.

(Acquisition of Location Information Based on Character Input)

FIG. 10 is a flowchart illustrating a location information adding process when the user's input is a character input and the timing of the user's input is set to the timing after imaging. Among steps illustrated in FIG. 10, steps S102, S104, S106, and S112 to S118 are the same as the processes denoted by the same step numerals illustrated in FIG. 6.

As illustrated in FIG. 10, in step S110, a character input indicating an imaging point is performed. Characters indicating the imaging point are, for example, a region name, a facility name, a building name, and the like. In addition, for example, a character group may be displayed on the image display unit 16 as the character input, and input characters may be selected and input by the operation lever 25 or the like. Here, an example of the character group (a software keyboard image) displayed on the image display unit 16 is illustrated in FIG. 11.

As illustrated in FIG. 11, the control unit 15 displays a character input screen 165 including the software keyboard image and the sentence "Please input a name (region name, building name, or the like) indicating an imaging point" for an input prompt on the image display unit 16. Because the touch panel 18 is stacked as described above, the image display unit 16 can also perform character selection when the user touches the screen.

Based on character data input as described above, the control unit 15 checks the database in step S112, and extracts location information in step S114.

The character input according to this embodiment is not limited to character selection from the character group illustrated in FIG. 11. For example, the character input may be a handwritten character input from the touch panel 18. These functions may be redundantly mounted.

Because the character input as the user's input is also possible as described above, the character input can serve as a comparatively cheap replacement means even when a function in which the imaging apparatus 10 recognizes voice is not mounted. In addition, the user's input can be reliably performed, for example, even in a state in which surrounding noise is large and a voice input is difficult or a state in which no sound is made, by adding a character input function to the imaging apparatus 10 according to the above-described first embodiment.

The character input, which is an example of the user's input for acquiring location information, has been described above in detail. Next, the timing at which the acquired location information is added to a captured image will be described.

(Acquisition Timing of Location Information)

Although the location information is acquired before an imaging operation, during the imaging operation, or after the image operation in the above-described first embodiment, the embodiment according to the present disclosure is not limited thereto. For example, if corresponding location information has not been extracted from the database 32, the control unit 15 may store a name input by the user or re-perform a search when a new database is mounted.

(Addition Timing of Location Information)

Although the addition of acquired location information to a captured image is illustrated in step S118 of FIGS. 6, 7, and 9 in the above-described first embodiment, the embodiment according to the present disclosure is not limited thereto. For example, the addition of the location information to the captured image may be changed to an arbitrary timing after an imaging operation.

For example, when data processing by the control unit 15 is limited because a battery capacity of the imaging apparatus 10 is small, the control unit 15 adds the location information to the captured image after the battery capacity is restored.

In addition, when there is not sufficient time to wait for a data processing time after each imaging operation such as continuous imaging, the control unit 15 adds location information to a captured image at a timing set by the user or set by the specs. More specifically, the control unit 15 may add the location information, for example, when a power supply is in a sleep mode.

Thereby, for example, even when battery power is consumed or even when data processing is time-consuming, the imaging apparatus 10 according to this embodiment can reliably add the location information to the captured image.

As described above, according to the first embodiment, the imaging apparatus 10 acquires the location information based on the user's input and adds the location information to the captured image when the location information acquisition unit 19 has not acquired the location information. Thereby, it is possible to add more accurate location information to a captured image even when the location information acquisition by the location information acquisition unit 19 is not possible.

Although the case in which the timing of the user's input is preset in the above-described first embodiment has been described, the embodiment according to the present disclosure is not limited thereto. For example, the user may input voice from the microphone by pressing the audio recording button 23 at an arbitrary timing. Thereby, for example, the user can input voice indicating a point when moving to an area in which a radio wave from the artificial satellite 50 is interrupted such as indoors or between high buildings. In this case, the control unit 15 stores location information acquired based on the voice input by the user in the recording unit 26, and then adds the location information stored in the recording unit 26 to a captured image for a given time.

In addition, in the above-described first embodiment, although it is determined whether or not location information acquisition by the GPS is possible immediately before the user's input (voice input, character input, or the like) as illustrated in step S104, the embodiment according to the present disclosure is not limited thereto. For example, even when the timing of the user's input is set to one of timings before/during/after imaging, the control unit 15 determines whether or not the location information acquisition by the GPS is possible during the imaging operation. If the location information acquisition by the GPS is not possible, the control unit 15 may add location information based on the user's inputs performed at a time closest to the imaging time.

In addition, the configuration of the embodiment according to the present disclosure is not limited to the configuration illustrated in FIG. 3, and, for example, may be a configuration according to the second embodiment to be described next.

(2-2. Second Embodiment)

In the second embodiment according to the present disclosure, first, the entire configuration of the location information adding system will be described with reference to FIG. 12. As illustrated in FIG. 12, an imaging apparatus 11 according to the second embodiment communicates with a server 60 while recognizing a base station 64 and a network 62.

The server 60 has a map database in which location information is associated with various names, extracts corresponding location information according to a request from the imaging apparatus 11, and transmits the extracted location information to the imaging apparatus 11.

Thereby, the imaging apparatus 11 according to this embodiment can acquire corresponding location information from the server 60 when making a location information acquisition request by transmitting the user's input information (various names indicating an imaging point) to the server 60. Next, the configuration of the imaging apparatus 11 according to this embodiment will be described with reference to FIG. 13.

(Configuration of Imaging Apparatus 11 According to Second Embodiment)

FIG. 13 is a block diagram illustrating the configuration of the imaging apparatus 11 according to the second embodiment. As illustrated in FIG. 13, the configuration of the imaging apparatus 11 according to this embodiment is different from that of the above-described first embodiment in that a communication unit 34 is provided without the database 32 for the location information search.

The communication unit 34 is an interface for communicating with an external apparatus, and performs wired or wireless communication. More specifically, the communication unit 34 according to this embodiment sends a location information acquisition request to the server 60 according to control of the control unit 15. In the location information acquisition request, the communication unit 34 transmits the user's input information. In addition, the communication unit 34 according to this embodiment acquires location information corresponding to the request from the server 60.

As described above, because the imaging apparatus 11 according to this embodiment can acquire location information from an external database, it is possible to acquire more accurate location information even when the imaging apparatus does not store the database 32. Although a configuration in which the database 32 for the location information search is not provided is illustrated in FIG. 13, the configuration of the imaging apparatus 11 according to this embodiment is not limited thereto. For example, the imaging apparatus 11 according to this embodiment may be configured to have the database 32 and the communication unit 34. In this case, the imaging apparatus 11 acquires location information from an external database via the communication unit 34 when the location information has not been acquired from the database 32. Thereby, the imaging apparatus 11 according to this embodiment can acquire more appropriate location information.

In addition, although the imaging apparatus 11 communicates with the server 60 while recognizing the base station 64 and the network 62 in the entire configuration illustrated in FIG. 12, the entire configuration according to this embodiment is not limited thereto. For example, the imaging apparatus 11 may be connected to an information processing apparatus such as a personal computer (PC) and acquire location information from a database within the information processing apparatus. In addition, the imaging apparatus 11 may be further connected to an external network via the connected information processing apparatus and may acquire the location information from a database on the external network.

In this embodiment, content of mutual communication between the imaging apparatus 11 and the server 60 is related to location information, and does not include a captured image so as to decrease an amount of data communication.

3. Conclusion

As described above, if location information has not been acquired by the location information acquisition unit 19 using the GPS, the imaging apparatus 10 according to the present disclosure acquires the location information based on the user's input and adds the acquired location information to a captured image. More specifically, the imaging apparatus 10 acquires corresponding location information from a map database in which names are associated with location information based on a name such as a region name, a facility name, or a building name input by the user.

Thereby, the imaging apparatus 10 according to the present disclosure can add appropriate location information of an imaging point to a captured image even when it is not possible to use the GPS.

In addition, the imaging apparatus 10 has a function of displaying a map on the image display unit 16 and arranging a previously captured image in a corresponding position on the map according to location information added to the image. However, stress is caused to the user because the location information added to the captured image may be erroneously arranged due to an error from an actual imaging point. According to the imaging apparatus 10 based on the present disclosure, the captured image is appropriately arranged on the map because appropriate location information of an imaging point can be added to the captured image even when no GPS is available as described above. Thereby, the user can enjoy a history of captured images without stress.

In addition, the imaging apparatus 10 according to the present disclosure adds location information to a captured image at a point in time before imaging, during the imaging, or after the imaging. Thereby, it is possible to improve the efficiency of editing because there is no complex process of manually re-adding location information when the user arranges captured images and inputs the arranged images to an information processing apparatus later.

In addition, according to the imaging apparatus based on the present disclosure, usability is improved because the timing of the user's input can be arbitrarily set based on the user's preference.

In addition, according to the imaging apparatus based on the present disclosure, the user's input for inputting a name such as a region name indicating an imaging point is implemented, for example, by a voice input or a character input. Because the voice input is possible, the user can easily input the name of the imaging point. In addition, because the character input is possible, the character input can serve as a comparatively cheap replacement means even when no voice recognition function is mounted in the imaging apparatus. In addition, according to the imaging apparatus based on the present disclosure, the voice input and the character input may be provided as the user's input means. Thereby, the user's input can be reliably performed, for example, even in a state in which surrounding noise is large and a voice input is difficult or a state in which no sound is made.

In addition, according to the imaging apparatus based on the present disclosure, location information can be acquired from an external map database. Thereby, it is possible to acquire more appropriate location information and add the location information to a captured image even when it is not possible to store a database due to a recording data capacity limit of the imaging apparatus or even when location information has not been acquired because only a database of some regions is stored. Content of mutual communication with an external map database is related to location information, and does not include image information so as to decrease an amount of data communication.

It should be understood by those skilled in the art that various modifications, combinations, sub-combinations and alterations may occur depending on design requirements and other factors insofar as they are within the scope of the appended claims or the equivalents thereof.

Although a process in which the control unit 15 determines whether or not location information acquisition by the location information acquisition unit 19 is possible, for example, in the above-described step S104, before imaging, during the imaging, or immediately after the imaging has been described, the determination method according to the present disclosure is not limited thereto. For example, if the location information acquisition by the location information acquisition unit 19 is not possible within a given time such as 10 minutes, 30 minutes, or one hour, the control unit 15 according to the present disclosure may determine that the acquisition is not possible. A time taken for the determination may be arbitrarily set by the specs of the imaging apparatus 10 or by the user.

In addition, the location information acquisition function based on the user's input provided in the imaging apparatus 10 of this embodiment may be arbitrarily set to be turned on/off by the user. If the location information acquisition function based on the user's input is OFF, the imaging apparatus 10 may add, for example, most recently acquired location information to a captured image when location information has not been obtained using the GPS before/during/after an imaging operation.

Additionally, the present technology may also be configured as below.

(1) An information processing apparatus comprising: a processor that acquires captured image data; determines whether a position determining unit of the information processing apparatus detects a location of the information processing apparatus; controls a user interface to prompt a user to enter information when it is determined that a location of the information processing apparatus has not been detected; and receives location information that is extracted based on a user input received at the user interface in response to the prompt.

(2) The information processing apparatus of (1), further comprising: an imaging unit that captures the image data; and the position determining unit configured to detect the location of the information processing apparatus based on one or a plurality of received wireless signals, wherein the processor associates the acquired location information with the captured image data.

(3) The information processing apparatus of any one of (1) to (2), further comprising: the user interface including a display that displays the prompt for the user to enter the information when it is determined that the location of the information processing apparatus has not been detected.

(4) The information processing apparatus of any one of (1) to (3), further comprising: a communication interface that transmits information corresponding to the user input to another information processing apparatus, and receives the location information that is extracted by the another information processing apparatus based on the information corresponding to the user input.

(5) The information processing apparatus of any one of (1) to (4), further comprising: a database that stores an association between first data and location information, wherein the processor extracts the location information by comparing the user input to the first data stored in the database, and extracts the location information from the database based on a result of the comparison.

(6) The information processing apparatus of any one of (1) to (5), wherein the processor controls the user interface to prompt the user to enter the information at a timing before the captured image data is acquired, while the captured image data is being acquired or after the captured image data is acquired based on a predetermined setting.

(7) The information processing apparatus of any one of (1) to (6), wherein the processor controls the user interface to display a graphic indicia indicating whether the location of the information processing apparatus has been detected.

(8) The information processing apparatus of (6), wherein the processor controls the user interface to display a graphic indicia indicating whether the location of the information processing apparatus has been detected at the timing before the captured image data is acquired, while the captured image data is being acquired or after the captured image data is acquired based on the predetermined setting.

(9) The information processing apparatus of any one of (1) to (8), wherein the processor controls the position determining unit to be deactivated when a remaining amount of power of a battery of the information processing apparatus is below a predetermined threshold value, and the processor controls the display to display a graphic indicia indicating the that the location of the information processing apparatus has not been detected when the position determining unit has been deactivated.

(10) The information processing apparatus of any one of (1) to (9), wherein the processor controls the user interface to prompt the user to provide at least one of a voice input and a text input when it is determined that the location of the information processing apparatus has not been detected.

(11) The information processing apparatus of (10), wherein the processor controls the user interface to display a character input interface including a software keyboard image when prompting the user to provide the text input.

(12). The information processing apparatus of any one of (1) to (11), wherein the received location information that is extracted based on the user input includes a plurality of pieces of location information, and the processor controls the user interface to display the plurality of pieces of location information.

(13) The information processing apparatus of (12), wherein the processor associates one of the plurality of pieces of location information with the captured image data based on a selection of the one of the plurality of pieces of location information received at the user interface.

(14) The information processing apparatus of any one of (1) to (13), wherein the received location information that is extracted based on the user input includes a plurality of pieces of location information covering a broad range of locations.

(15) The information processing apparatus of (14), wherein the processor performs an automatic filtering process to select points of interest in the broad range of locations.

(16) The information processing apparatus of (15), wherein the processor controls the user interface to display the selected points of interest.

(17) The information processing apparatus of (16), wherein the processor associates location information corresponding to one of the selected points of interest with the captured image data based on a selection of the one of selected points of interest received at the user interface.

(18) The information processing apparatus of any one of (2) to (17), wherein the processor controls the user interface to display a map including the captured image data at a position corresponding to the acquired location information with which the captured image data is associated.

(19) A method performed by an information processing apparatus, the method comprising: acquiring captured image data; determining whether a position determining unit of the information processing apparatus detects a location of the information processing apparatus; controlling a user interface to prompt a user to enter information when it is determined that a location of the information processing apparatus has not been detected; and receiving location information that is extracted based on a user input received at the user interface in response to the prompt.

(20) A non-transitory computer-readable medium including computer program instruction, which when executed by an information processing apparatus, cause the information processing apparatus to perform a process comprising: acquiring captured image data; determining whether a position determining unit of the information processing apparatus detects a location of the information processing apparatus; controlling a user interface to prompt a user to enter information when it is determined that a location of the information processing apparatus has not been detected; and receiving location information that is extracted based on a user input received at the user interface in response to the prompt.

REFERENCE SIGNS LIST 10, 11 Imaging apparatus
12 Optical component
14 Imaging unit
15 Control unit
16 Image display unit
18 Touch panel
19 Location information acquisition unit
20 Operation unit
21 Shutter button
22 Mode switch
23 Audio recording button
24 Menu button
25 Operation lever
26 Recording unit
28 Voice input unit
30 Recording medium
32 Database
34 Communication unit
42 Battery icon
44, 46 GPS icon
50A to 50C Artificial satellite
60 Server

The invention claimed is:

1. A first information processing apparatus, comprising:
a control unit configured to:
determine a condition that first information of the first information processing apparatus is undetected;
acquire captured image data;
control a display screen to display an information input image based on the acquired captured image data,
wherein the control of the display screen is based on the determination that the first information of the first information processing apparatus is undetected;
receive an input based on an instruction related to the information input image; and
extract the first information based on the received input,
wherein the display screen is controlled to set a timing of the input to one of a timing before an imaging operation of the captured image data, a timing during the imaging operation of the captured image data, or a timing after the imaging operation of the captured image data,
wherein a setting screen, displayed on the display screen, comprises a plurality of user selectable items to set the timing of the input, and
wherein the plurality of user selectable items comprise a user selectable item to set the timing of the input to the timing during the imaging operation of the captured image data.

2. The first information processing apparatus of claim 1, further comprising:
an imaging unit configured to capture the image data,
wherein the control unit is further configured to associate the first information with the captured image data.

3. The first information processing apparatus of claim 1, wherein the control unit is further configured to:
transmit second information corresponding to the instruction to a second information processing apparatus; and
receive third information that is extracted by the second information processing apparatus,
wherein the third information is received based on the second information corresponding to the instruction.

4. The first information processing apparatus of claim 1, wherein the control unit is further configured to control the display screen to display a graphic icon that indicates the first information of the first information processing apparatus is detected.

5. The first information processing apparatus of claim 1, wherein the control unit is further configured to:
deactivate the determination, based on a remaining amount of power of a battery of the first information processing apparatus,
wherein the remaining amount of power is below a threshold value; and
display a graphic icon that indicates the first information of the first information processing apparatus is undetected, based on the deactivation.

6. The first information processing apparatus of claim 1, wherein the control unit is further configured to control the display screen to display a character input interface that includes a software keyboard image to provide a text input.

7. The first information processing apparatus of claim 1, wherein the extracted first information includes a plurality of pieces of location information, and wherein the control unit is further configured to control the display screen to display the plurality of pieces of location information.

8. The first information processing apparatus of claim 7, wherein the control unit is further configured to select one of the plurality of pieces of location information based on a user operation.

9. The first information processing apparatus of claim 8, wherein the control unit is further configured to associate one of the plurality of pieces of location information with the captured image data, based on the selection of one of the plurality of pieces of location information.

10. The first information processing apparatus of claim 2, wherein the control unit is further configured to control the display screen to display a map that includes the captured image data at a position corresponding to the first information with which the captured image data is associated.

11. A method, comprising:
in an information processing apparatus:
determining a condition that information of the information processing apparatus is undetected;
acquiring captured image data;
controlling a display screen to display an information input image based on the acquired captured image data,
wherein the controlling of the display screen is based on the determination that the information of the information processing apparatus is undetected;
receiving an input based on an instruction related to the information input image; and
extracting the information based on the received input,
wherein the display screen is controlled for setting a timing of the input to one of a timing before an imaging operation of the captured image data, a timing during the imaging operation of the captured image data, or a timing after the imaging operation of the captured image data,
wherein a setting screen, displayed on the display screen, comprises a plurality of user selectable items to set the timing of the input, and
wherein the plurality of user selectable items comprise a user selectable item to set the timing of the input to the timing during the imaging operation of the captured image data.

12. A non-transitory computer-readable medium having stored thereon computer-executable instructions that, when executed by an information processing apparatus, cause the information processing apparatus to execute operations, the operations comprising:
determining a condition that information of the information processing apparatus is undetected;
acquiring captured image data;
controlling a display screen to display an information input image based on the acquired captured image data,
wherein the controlling of the display screen is based on the determination that the information of the information processing apparatus is undetected;
receiving an input based on an instruction related to the information input image; and
extracting the information based on the received input,
wherein the display screen is controlled for setting a timing of the input to one of a timing before an imaging operation of the captured image data, a timing during the imaging operation of the captured image data, or a timing after the imaging operation of the captured image data,
wherein a setting screen, displayed on the display screen, comprises a plurality of user selectable items to set the timing of the input, and
wherein the plurality of user selectable items comprise a user selectable item to set the timing of the input to the timing during the imaging operation of the captured image data.

* * * * *